United States Patent [19]

Letinski

[11] Patent Number: 4,681,716
[45] Date of Patent: Jul. 21, 1987

[54] PROCESS FOR THE PREPARATION OF POLYBENZIMIDAZOLE FOAMS

[75] Inventor: John S. Letinski, Metuchen, N.J.

[73] Assignee: Celanese Corporation, New York, N.Y.

[21] Appl. No.: 835,812

[22] Filed: Mar. 3, 1986

[51] Int. Cl.$^4$ .............................................. B29D 7/01
[52] U.S. Cl. ...................................... 264/53; 264/140; 264/331.16; 264/DIG. 5; 521/50; 521/89; 521/90; 521/94; 521/184; 521/185
[58] Field of Search .............. 264/53, 331.16, DIG. 5; 521/50, 89, 90, 94, 185, 184

[56] References Cited

U.S. PATENT DOCUMENTS 4,092,274 5/1978 Fletcher et al. .................... 521/185
4,588,808 5/1986 Ward .................................. 528/337
4,598,099 7/1986 Trouw ................................. 521/77

Primary Examiner—Morton Foelak
Attorney, Agent, or Firm—Lynch, Cox & Gilman

[57] ABSTRACT

The present invention is a process for the preparation of polybenzimidazole foams. Polybenzimidazoles containing 10 to 30 percent by weight residual solvent can be heated at a temperature of about 350° C. to about 600° C. to produce three dimensional foamed articles.

18 Claims, No Drawings

PROCESS FOR THE PREPARATION OF POLYBENZIMIDAZOLE FOAMS

BACKGROUND OF INVENTION

1. Field of Invention

This invention relates to a process for the preparation of foams. More particularly, this invention relates to the preparation of polybenzimidazole foams which are useful as high temperature insulation materials.

2. Prior Art

Many polymeric materials have been used in forming foam in the prior art; there are virtually as many methods of foaming prior art polymers as there are polymers. One example of a prior art polymer which readily can be foamed is polystyrene. However, a major problem with prior art polymeric foams is their lack of heat resistance. While these foams exhibit good insulation properties and provide an excellent medium for packing of delicate articles, when these foams are subject, even to moderately elevated temperatures, they will collapse and lose their insulation or packaging properties.

Accordingly, it is an object of this invention to produce foams which exhibit good insulation and packaging properties.

It is another object of this invention to produce polybenzimidazole based foams.

It is another object of this invention to produce foams which maintain their foamed structure even when subject to elevated temperatures.

These and other objects are obtained by preparing polybenzimidazole foams according to the process of the instant invention.

SUMMARY OF INVENTION

Disclosed herein is a process for preparing a polybenzimidazole foam which comprises:

(a) preparing a solvent solution of a polybenzimidazole polymer;

(b) depositing said solvent solution upon a support to form a polybenzimidazole polymer film;

(c) removing sufficient solvent from the deposited film such that the film retains solvent in the range of about 10 to 30 percent by weight based on the total film weight;

(d) grinding or crushing the film to form a powder; and (e) foaming the powder at a temperature in the range of about 350° C. to about 600° C.

DETAILED DESCRIPTION OF INVENTION

A. The Starting Material

The polymeric material used to form the foams of the present invention is a linear polybenzimidazole. Polybenzimidazoles are a known class of heterocyclic polymers. Typical polymers of this class and their preparation are more fully described in U.S. Pat. No. 2,895,948, U.S. Pat. No. Re. 26,065, and in the Journal of Polymer Science, Vol. 50, pages 511–539 (1961) which are herein incorporated by reference. The polybenzimidazoles consist essentially of recurring units of the following Formulas I and II. Formula I is:

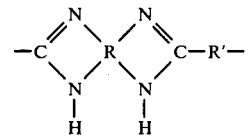

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

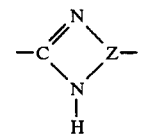

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heteroyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

poly-2,2'(m-phenylene)-5,5'-bibenzimidazole;
poly-2,2'-(pyridylene-3",5")-5,5'-bibenzimidazole;
poly-2,2'(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-dibenzimidazole;
poly-2,2'(m-phenylene)-5,5'-di(benzimidazole)ether;
poly-2,2'(m-phenylene)-5,5'-di(benzimidazole)sulfide;

poly-(2,2'(m-phenylene)-5,5'-di(benzimidazole)sulfone;

poly-2,2'(m-phenylene)-5,5'-di(benzimidazole)methane;

poly-2',2''(m-phenylene)-5,5''-di(benzimidazole)propane-2,2;

and poly-2,2'-(m-phenylene)-5',5''-di(benzimidazole)ethylene-1,2 where the double bonds of the ethylene groups are intact in the final polymer.

The most preferred polybenzimidazole for use in the present process is one prepared from poly-2,2'-(m-phenylene)-5,5'-bibenzimidazole, the recurring unit of which is:

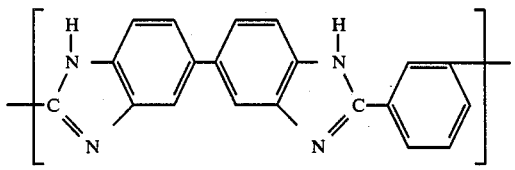

Any polymerization process known to those skilled in the art may be employed to prepare the polybenzimidazole which may then be formed into a foam according to the instant invention. Representative techniques for preparing the polybenzimidazole are disclosed in U.S. Pat. Nos. 3,509,108, 3,549,603, 3,551,389, 4,312,976, 4,452,971, 4,452,972, 4,483,977 and 4,485,232 which are incorporated herein by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably from 1 to 3 hours, the prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.25. In a preferred embodiment, the inherent viscosity of the polybenzimidazole polymer utilized in this invention is in the range of about 0.25 to 0.7.

The temperature employed in the second stage is at least 250° C., preferably at least 325° C., and more preferably from about 350° to 425° C. The second stage reaction generally takes at least 0.5 hour, and preferably from about 1 to 4 hours or more. It is, of course, also possible to prepare the instant polymers via a one-step reaction. However, the previously-described two-step process is preferred.

THE POLYMER SOLUTION

The solvents utilized to form the polybenzimidazole polymer solution include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethylacetamide, N,N-dimethylformamide, dimethylsulfoxide, and N-methyl-2-pyrrolidone. The particularly preferred solvent is N,N-dimethylacetamide.

The polymer solutions may be prepared, for example, by dissolving sufficient polybenzimidazole in the solvent to yield a final solution containing from about 5 to 30 percent by weight of polymer based on the total weight of the solution, and preferably from about 5 to 25 percent by weight. The quantity of polybenzimidazole dissolved in the solvent should be such that the resulting solution has a viscosity of about 50 to 4,000 poise at 30° C., and preferably about 400 to 600 poise.

One suitable means for dissolving the polymer in the solvent is by mixing the materials at a temperature above the normal boiling point of the solvent, for example, about 25° to 120° C. above such boiling point, and at a pressure of about 2 to 15 atmospheres for a period of about 1 to 5 hours. The resulting solutions are preferably filtered to remove any undissolved polymer.

FILM FORMATION

There are several methods by which the intermediary film may be formed. However, the method of preparation of the film is not crucial and many methods well known in the art may be used to prepare the films of the instant invention. In the preferred method, the polybenzimidazole dope, as prepared above, is deposited upon a support which may be selected from a wide variety of materials including ceramic, glass or metallic plates (e.g. stainless steel). In addition, steel, ceramic or glass plates coated with a teflon or teflon-like materials may also be employed. The support is preferably provided with retaining elements or raised edges whereby the solution is confined to the surface thereof at the desired location until its consistency is such that retaining elements are no longer needed. Numerous techniques are available for the application of the solution to the support as will be apparent to those skilled in the art. See for example, U.S. Pat. Nos. 4,020,142, 3,851,025 and 3,699,038. For instance, the polybenzimidazole polymer solution may simply be poured upon a level support in a quantity sufficient for it to assume the desired film thickness.

The thickness of the wet film deposited upon the support is not critical to the ultimate product. Generally, the wet film is deposited upon the support in a generally uniform thickness of about 0.2 to 30.0 mils and preferably about 1 to 15 mils. In a particularly preferred embodiment of the invention, the wet film is deposited to a thickness of about 5 to 10 mils. A quantity of solvent is next evaporated from the wet film to allow the formation of a relatively solid polybenzimidazole polymer film. Preferably, the polybenzimidazole polymer film should retain about 10 to about 30 percent by weight solvent in the polybenzimidazole polymer. In the most preferred embodiment the solvent is retained in quantities of about 15 to 25 percent.

The partial evaporation of solvent from the wet film may be accomplished by a variety of techniques. For instance, a stream of air or other gas at ambient or at an elevated temperature (e.g. approaching the boiling point of the solvent) may simply be directed at the exposed surface of the wet film. Other methods of evaporation are listed in U.S. Pat. No. 4,512,894 which is hereby incorporated by reference.

In a particularly preferred embodiment the wet polybenzimidazole film is applied to a teflon coated, metallic-based, steam table. The dope is then heated for about 2 hours to about 5 hours to produce a film containing from about 10 to about 30 percent by weight solvent and having a film thickness of about 1 to about 15 mils.

FOAMING PROCESS

After the solvent-containing film has been prepared, it may be cut into sections of convenient size and stored until it is to be ground into a powder and used in preparing the foamed products of this invention. Alternatively, the film may be crushed, ground or otherwise formed into a powder or particles of small size and then stored until the powder is to be foamed.

The size of the particles will depend upon operating and processing conditions of the molding process and the degree of intermixing that may be necessary with added components such as fillers or reinforcing agents. In addition, when smaller sized foam particles are needed, it is necessary that the powder particles be of corresponding smaller size. Where the molding of intricately shaped small sized articles is desired, or where a high degree of intermixing with added reinforcing agents is required, about 40 to 100 mesh powders are employed, most preferably about 40 to 60 mesh powders.

Many methods may be employed for preparing the film shards into a powder. Of course, it is necessary that the grinding process be carried out under conditions such that the solvent content of the ground particles does not fall below the minimum limits specified above, (i.e., about 10 percent by weight of solvent). The preferred grinding process for the film prepared according to the process of the instant invention involves breaking the film up into sizes of less than about 1 inch square and adding the broken film to a freezer mill which is surrounded by liquid nitrogen or another cooling media such that the film is ultimately cooled by a media having a low temperature, e.g., about −190° C. to about −210° C. The freezer mill can employ any of a variety of actual grinding mechanisms. Preferably the freezer mill employs ultrasonic techniques wherein a grinding device such as a metallic rod is vibrated to break up the film for about 5 to about 30 minutes.

The particles which result from this process are non-sintering and are stable, even after having been stored for many months at, or even slightly above, ambient temperatures.

Prior to foaming, the polybenzimidazole powder can be placed into molds to form shaped three dimensional articles. However, it is not necessary to mold the polybenzimidazole powders and films of the instant invention prior to foaming. After being placed in a mold, the powder is preferably compression molded using conventional techniques. Generally, the molded material is compression molded at or slightly above the softening range of the polymer for from 10 to about 30 minutes. For the preferred polybenzimidazole polymers this temperature will range from about 180° C. to 260° C., preferably from about 200° C. to about 225° C.

The polybenzimidazole particles described above may be compounded with various fillers, extenders, reinforcing agents and the like, added to the compression mold or another type of mold and molded to produce articles having improved strength properties when they are subsequently foamed. Examples of such materials include titanium dioxide, fiberglass, graphite, carbon fibers, various clays and other well known products.

Where large sized articles are to be foamed, the film can be used directly if it can conveniently be added to the compression mold or it may be slightly broken up by conventional breakage methods and added directly to the compression mold without actual freezer milling. The film may then be compression molded either alone or with the fillers, reinforcing agents or the like specified above for the same period of time and under the same conditions as specified above.

The polybenzimidazole can be foamed either as a film, (either whole or cut up), a powder or a molded article (as prepared above) to produce a three-dimensional foamed article. The polybenzimidazole film, powder or molded article is heated to a temperature ranging from about 350° to about 600° C. to produce a foamed article. At a temperature at or below 250° C., the polybenzimidazole does not foam. The preferred range is about 400° C. to about 600° C. The polybenzimidazole polymer is held at the elevated temperature for approximately 30 seconds to five minutes. The preferred time is about 1 to about 4 minutes.

The foams and foamed articles produced by the present process are rigid and have non-burning characteristics. Consequently, the foams can be used as insulators and in fire resistant articles.

The invention is illustrated by the following examples.

EXAMPLES

Example 1

A polybenzimidazole/dimethylacetamide dope containing about 5 percent by weight of a polybenzimidazole polymer was prepared from poly-2,2'-(m-phenylene)-5,5'-bibenzimidazole having an inherent viscosity of 0.6. The dope was cast on a teflon coated steel steam table and continuously steam heated at 100° C. for a period of 3 hours. The film formed by this process showed an inconsistent thickness of about 5–10 mils. Gas chromatography analysis of the film showed that the film had retained about 20.3 percent by weight dimethylacetamide. The resulting film was broken up into film shards having a maximum size of about 1 inch square and ground in a freezer mil for 15 minutes under liquid nitrogen at a temperature of −195° C. A uniform 40 mesh powder resulted. The powder was foamed by placing the powder in a porcelain dish and then exposing the powder to a temperature of 400° C. in a furnace at ambient pressure for 3 minutes. When heated, the powder foamed to produce microspheres with a density of 0.16 g/cc.

Example 2

Example 1 was repeated except that the film was not ground into a powder after being broken up into shards. Instead, the shards were placed in a furnace and foamed under the same conditions as in Example 1 to yield a rigid, square-shaped, foamed article. The foamed article had a density of 0.16 g/cc and did not melt or burn when exposed to a naked match flame

Example 3

Example 1 is repeated except that the powder is molded into a three dimensional article prior to being foamed. The uniform 40 mesh powder is added to a compression mold and molded at a temperature of 200° C. for 20 minutes to produce a square container. The container is then foamed in a furnace under the same conditions as in Example 1 to yield a three dimensional foamed square container with non-burning characteristics and a density of 0.16 g/cc.

Example 4

Example 1 is repeated except that the 40 mesh powder is mixed on a 50 percent by weight basis with graphite fibers and compression molded at a temperature of 230° C. for 20 minutes to produce a shaped article. When heated in a furnace under the same conditions as in Example 1, a three dimensional foamed article with non-burning characteristics is formed.

What is claimed is:

1. A process for the production of polybenzimidazole foamed articles comprising:
   (a) forming a solvent solution of a polybenzimidazole polymer wherein the inherent viscosity of the polybenzimidazole polymer is in the range of about 0.25 to 0.7;
   (b) casting a film from the solvent solution;
   (c) removing sufficient solvent from the polymer such that the film contains from about 10 to about 30 percent by weight of the solvent; and
   (d) heating the polymer in the temperature range of about 350° C. to about 600° C. to form a foamed article.

2. The process of claim 1 wherein the film formed in step (c) is crushed prior to heating.

3. The process of claim 2 wherein the film formed in step (c) is milled to form a polybenzimidazole polymer powder prior to heating.

4. The process of claim 3 wherein the powder is molded into a shaped article prior to heating.

5. The process of claims 1, 3 or 4 wherein sufficient solvent is removed from the deposited film such that the film contains about 15 to about 25 percent by weight of the solvent.

6. The process of claims 1, 3 or 4 wherein the film is deposited upon the support to a wet film thickness of about 0.2 to 30.0 mils.

7. The process of claim 6 wherein the film is deposited on the support to a wet film thickness of about 5.0 to about 10.0 mils.

8. The process of claims 1, 3 or 4 wherein the polybenzimidazole polymer consists essentially of recurring units of the formula:

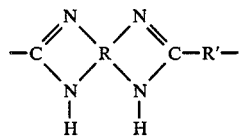

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

9. The process of claims 1, 3 or 4 wherein the polybenzimidazole polymer consists essentially of recurring units of the formula:

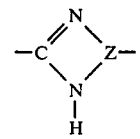

wherein Z is an aromatic nucleus having the nitrogen atoms forming the benzimidazole rings paired upon adjacent carbon atoms of said aromatic nucleus.

10. The process of claims 1, 3 or 4 wherein the polybenzimidazole polymer is poly-2,2'-(m-phenylene)-5,5'-bibenzimidazole.

11. The process of claims 1, 3 or 4 wherein the solvent for the polybenzimidazole polymer is selected from the group consisting of N,N-dimethylacetamide, N,N-dimethylformamide, dimethylsulfoxide and N-methyl-2-pyrrolidone.

12. The process of claims 1, 3 or 4 wherein the solvent is N,N-dimethylacetamide.

13. A process for the production of foamed polybenzimidazole articles comprising:
   (a) forming a solvent solution of a polybenzimidazole polymer wherein the polybenzimidazole polymer exhibits an inherent viscosity of about 0.25 to 0.7 and wherein the solvent is selected from the group consisting of N,N-dimethylacetamide, N,N-dimethylformamide, dimethylsulfoxide and N-methyl-2-pyrrolidone;
   (b) casting a polybenzimidazole polymer film from the solvent solution;
   (c) removing sufficient solvent from the film such that the film retains about 10 to about 30 percent by weight of the solvent; and
   (d) heating the film at a temperature in the range of about 350° C. to about 600° C. to form a foamed article.

14. A process for the production of shaped polybenzimidazole articles comprising:
   (a) forming a solvent solution of a polybenzimidazole polymer wherein the polybenzimidazole polymer exhibits an inherent viscosity of about 0.25 to 0.7 and wherein the solvent is selected from the group consisting of N,N-dimethylacetamide, N-N-dimethylformamide, dimethylsulfoxide and N-methyl-2-pyrrolidone;
   (b) casting a polybenzimidazole polymer film from the solvent solution;
   (c) removing sufficient solvent from the film such that the film retains about 10 to about 30 percent by weight of the solvent;
   (d) forming the film into a polybenzimidazole powder; and
   (e) heating the powder at a temperature in the range of about 350° C. to 600° C. to form foamed articles.

15. A process according to claims 1, 13 or 14 wherein the heating of the polybenzimidazole polymer takes place at about 400° C. to about 500° C.

16. A process according to claims 1, 13 or 14 wherein the polybenzimidazole is heated for about 30 seconds to about 5 minutes.

17. The process of claim 13 wherein the film is molded into a shaped article prior to heating.

18. The process of claim 14 wherein the powder is molded into a shaped article prior to heating.

* * * * *